US 11,282,541 B2

(12) United States Patent
Hasegawa et al.

(10) Patent No.: US 11,282,541 B2
(45) Date of Patent: Mar. 22, 2022

(54) RECORD CONTROL APPARATUS

(71) Applicant: DENSO CORPORATION, Kariya (JP)

(72) Inventors: Takuya Hasegawa, Kariya (JP); Kazuaki Hayakawa, Kariya (JP)

(73) Assignee: DENSO CORPORATION, Kariya (JP)

(*) Notice: Subject to any disclaimer, the term of this patent is extended or adjusted under 35 U.S.C. 154(b) by 387 days.

(21) Appl. No.: 16/566,528

(22) Filed: Sep. 10, 2019

(65) Prior Publication Data

US 2020/0005829 A1    Jan. 2, 2020

Related U.S. Application Data

(63) Continuation of application No. PCT/JP2018/020962, filed on May 31, 2018.

(30) Foreign Application Priority Data

May 31, 2017 (JP) .............................. JP2017-108170

(51) Int. Cl.
| | | |
|---|---|---|
| *G05D 1/00* | (2006.01) | |
| *G11B 20/12* | (2006.01) | |
| *B60R 16/00* | (2006.01) | |
| *G06F 21/60* | (2013.01) | |
| *G07C 5/08* | (2006.01) | |
| *H04L 12/28* | (2006.01) | |
| *G08G 1/00* | (2006.01) | |

(52) U.S. Cl.
CPC .............. *G11B 20/12* (2013.01); *B60R 16/00* (2013.01); *G06F 21/60* (2013.01); *G07C 5/085* (2013.01); *H04L 12/28* (2013.01); *G07C 2205/00* (2013.01); *G08G 1/00* (2013.01)

(58) Field of Classification Search
CPC ......... G11B 20/12; B60R 16/00; G06F 21/60; G07C 5/085; H04L 12/28
See application file for complete search history.

(56) References Cited

U.S. PATENT DOCUMENTS

| | | |
|---|---|---|
| 6,259,386 B1 | 7/2001 | Miyawaki et al. |
| 2013/0041522 A1* | 2/2013 | Mori .................... G07C 5/0808 701/1 |
| 2013/0047028 A1 | 2/2013 | Daikokuya et al. |
| 2017/0270305 A1 | 9/2017 | Kodama et al. |

FOREIGN PATENT DOCUMENTS

| | | |
|---|---|---|
| JP | 2013041443 A | 2/2013 |
| JP | 2016045860 A | 4/2016 |
| WO | WO-9950849 A1 | 10/1999 |

* cited by examiner

*Primary Examiner* — Adam M Alharbi
(74) *Attorney, Agent, or Firm* — Harness, Dickey & Pierce, P.L.C.

(57) ABSTRACT

A record control apparatus controls record of a data item in one or more record sections. The record control apparatus includes: a data acquisition section that acquires the data item having multiple types; a data storage section that stores in the record section, the one or more data items matching a record condition prepared in advance among the acquired data item having multiple types; and a condition change section that defines the record condition as an old record condition, and sets so that the data storage section utilizes a new record condition in place of the old record condition when receiving the new record condition different from the old condition from an outside.

9 Claims, 8 Drawing Sheets

RECORD CONTROL APPARATUS

CROSS REFERENCE TO RELATED APPLICATION

The present application is a continuation application of International Patent Application No. PCT/JP2018/020962 filed on May 31, 2018, which designated the U.S. and claims the benefit of priority from Japanese Patent Application No. 2017-108170 filed on May 31, 2017. The entire disclosures of all of the above applications are incorporated herein by reference.

TECHNICAL FIELD

The present disclosure relates to a technique for controlling a record of data in a record section.

BACKGROUND ART

A technology for recording data collected by a vehicle in a record section is proposed.

SUMMARY

The present disclosure provides a technology capable of efficiently recording required data in accordance with a capacity of a record section in a record control apparatus configured to control a record of the data in one or more record sections.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In a case of recording data, the data required in accordance with situation changes. Therefore, the data requiring a record also differs. A result of the inventor's detailed investigation found out a difficulty. Regarding the difficulty, the technology may provide all of the required data when all data is recorded. However, since a capacity of a record section has an upper limit, all of the data may not be recorded.

An example embodiment provides a technology capable of efficiently recording required data in accordance with a capacity of a record section in a record control apparatus configured to control a record of the data in one or more storage sections.

According to an example embodiment, a record control apparatus is configured to control record of a data item in a record section, and includes: a data acquisition section; a data storage section; and a condition change section.

The data acquisition section is configured to acquire the data item having multiple types. The data storage section is configured to store, in the record section, a data item among the acquired data item that matches a record condition prepared in advance.

The condition change section is configured to define the record condition as an old record condition, and to execute settings for utilizing a new record condition in place of the old record condition when the new record condition different from the old record condition is received from outside.

In such a record control apparatus, it may be possible to storage the data item in the record section in accordance with a new record condition when the new record condition is received. It may be possible to efficiently storage the required data item in accordance with the capacity of the storage section by setting an appropriate record condition.

Embodiments according to one aspect of the present disclosure will be described below with reference to the drawings.

1. Embodiment

1-1. Configuration

Figure 1:
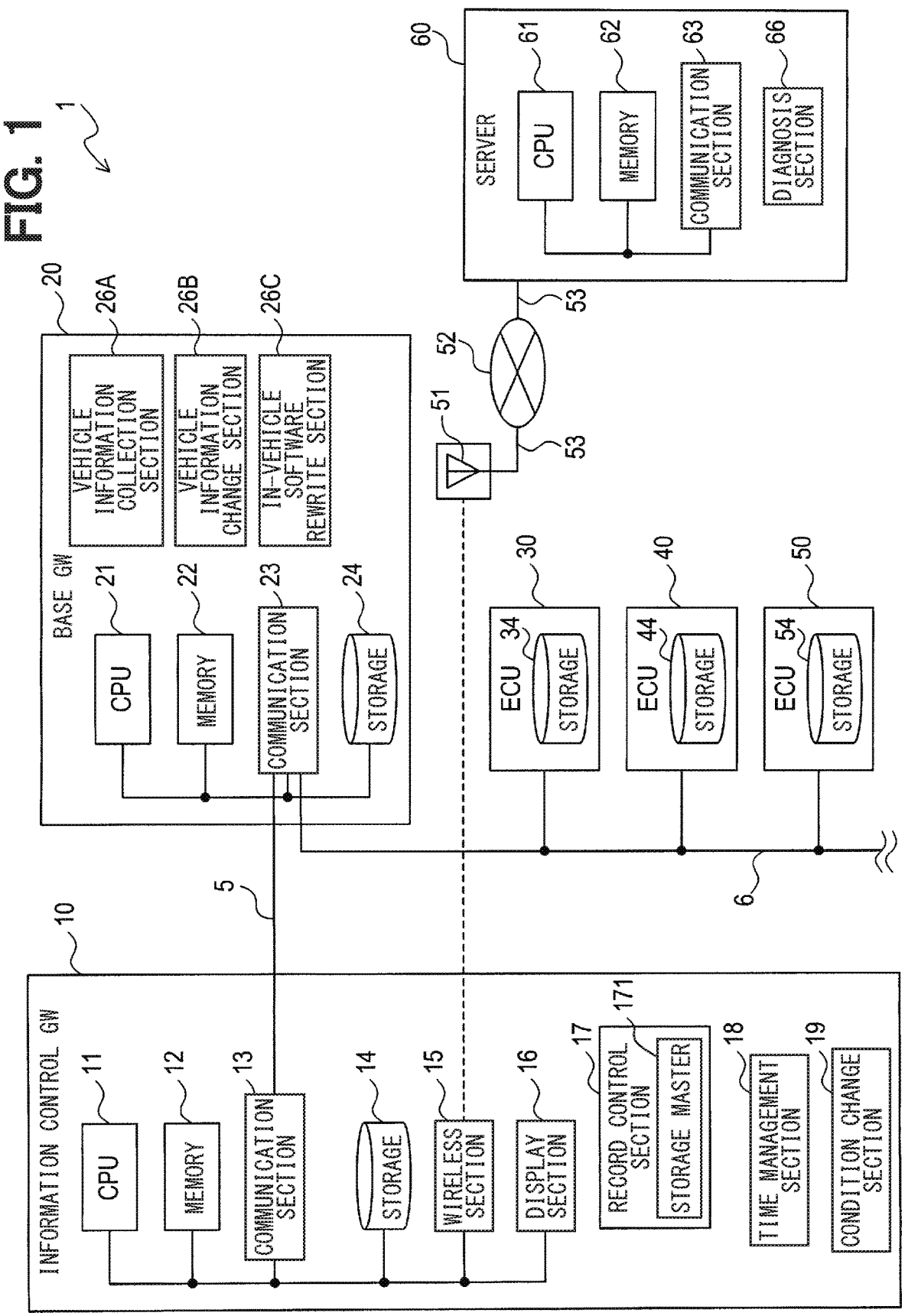
FIG. 1 is a block diagram showing a configuration of a data providing system 1.

A data providing system 1 shown in FIG. 1 has a function of collecting appropriate information in a vehicle and providing the information to an outside. The data providing system 1 includes an information control GW 10, a basic GW 20, and a communication line 5. The GW is an abbreviation of gateway.

The communication line 5 communicably connects the information control GW 10 and the basic GW 20. The data providing system 1 may include a communication line 6, each of ECUs 30, 40, and 50, and a server 60. The communication line 6 communicably connects the basic GW 20 and each of the ECUs 30, 40, and 50.

The information control GW 10, the basic GW 20, the communication lines 5 and 6, and each of the ECUs 30, 40, and 50 are mounted on the vehicle. The server 60 is placed outside the vehicle. The server 60 is communicable with the information control GW 10 via a communication line 53, an internet network 52, and a base station 51. The base station 51 corresponds to a well-known base station such as a mobile phone, and communicates with the vehicle via a wireless section 15 described later.

The information control GW 10, the basic GW 20, and the server 60 mainly include a well-known microcomputer respectively having CPUs 11, 21, and 61, and a semiconductor memory (hereinafter, referred to as memories 12, 22, and 62) such as a RAM, a ROM, or a flash memory.

The information control GW 10, the basic GW 20, and the server 60 respectively include communication sections 13, 23, and 63. The information control GW 10 and the basic GW 20 respectively further include storages 14 and 24. The information control GW 10 further includes the wireless section 15, and a display section 16.

The communication sections 13, 23, and 63 function as a well-known communication interfaces utilized at a time of performing a communication via the communication lines 5, 6, and 53 connected to the own apparatus.

The storages 14 and 24 are configured as arbitrary storage areas such as a hard disk drive or the flash memory. As the storages 14 and 24, a well-known configuration may be employed.

The wireless section 15 is configured as a well-known wireless communication module that communicates with the base station 51. The display section 16 is configured as a well-known display that displays an image in accordance with a movie signal.

The ECUs 30, 40, and 50 respectively include the CPU and the memory (not shown). The ECUs 30, 40, and 50 respectively include storages 34, 44, and 54.

The CPUs of the ECUs 30, 40, and 50 have a function of communicating with the apparatuses via the communication line 6, and a function of reading/writing data to designated addresses of the storages 34, 44, and 54 in the own apparatus in accordance with an instruction from the outside. The CPUs of the ECUs 30, 40, and 50 has a function of recognizing a free area of the storages 34, 44, and 54 in the own apparatus and transmitting this information to an apparatus connected to the communication line 6 such as the basic GW 20. The data may be referred to Each of the functions of the information control GW 10, the basic GW 20, and the server 60 is implemented by the CPUs 11, 21, and 61 executing a program stored in a non-transitory tangible storage medium. In this example, the memories 12, 22, and 62 correspond to the non-transitory tangible storage medium stored in the program.

By execution of this program, a method corresponding to the program is performed. The non-transitory tangible storage medium means a record medium excluding electromagnetic waves. The number of microcomputers constituting the information control GW 10, the basic GW 20, and the server 60 may be one or more.

As a configuration of functions implemented by the program execution of the CPU 11, as shown in FIG. 1, the information control GW 10 includes a record control section 17, a time management section 18, and a condition change section 19.

A function of the record control section 17 monitors data flowing in the communication line 5, and acquires multiple types of data among these data. Data matching a record condition prepared in advance among the acquired data is stored in the storages 14, 24, 34, 44, and 54. That is, the function of the record control section 17 controls a record of data to the storages 14, 24, 34, 44, and 54.

The record condition indicates a condition such as a type of data, a record cycle, a resolution, a collection time, a presence/absence of a signal as a trigger. Details will be described in a vehicle process described later or the like.

The function of the time management section 18 applies, in accordance with an absolute time, a time of acquiring the data to the data stored in the storages 14, 24, 34, 44, and 54. The absolute time corresponds to the time managed by the information control GW 10. Details of the function of the time management section 18 will be described in a record process described later.

A function of the condition change section 19 executes a process of changing the record condition when recording a function of an application or data in accordance with the external instruction.

The basic GW 20 has a function as a gateway apparatus that relays the data, and includes a vehicle information collection section 26A, a vehicle information conversion section 26B, and an in-vehicle software rewrite section 26C, as a configuration of a function implemented by the CPU 21 executing the program. A function of the gateway apparatus relays the data to be relayed between the multiple communication lines 5 and 6 in accordance with a table prepared in advance.

A function of the vehicle information collection section 26A collects the vehicle information necessary for a failure diagnosis process or the like. The function of the vehicle information collection section 26A may include a function as a vehicle information providing proxy, a diagnosis master, or the like described later.

A function of the vehicle information conversion section 26B converts the vehicle information to a data type suitable for a utilized application, and provides the vehicle information. The function of the vehicle information conversion section 26B may include a function as the vehicle information providing proxy or the like described later. That is, the function of the vehicle information conversion section 26B is configured to convert the data stored in the record section to the corresponding preset type in accordance with the type of service or application in a data providing destination. The function of the vehicle information conversion section 26B is configured to output the converted data to the data providing destination.

Specifically, when information on a vehicle speed is provided, raw data such as "1500 pulses/sec" may be provided, data obtained by converting raw data to a speed such as "100 km/h" may be provided, or data obtained by converting to magnitude relation to a certain speed such as "limitation speed exceeding" may be provided. That is, after conversion to a type which a service user easily uses, the data may be provided.

A function of the in-vehicle software rewrite section 26C rewrites the application mounted on the vehicle. The function of the in-vehicle software rewrite section 26C may include a function as a reprogram master or the like.

As shown in FIG. 1, the server 60 includes a diagnosis section 66 as a configuration of a function implemented by the CPU 61 executing the program. The function of the diagnosis section 66 diagnoses the failure in the vehicle while changing the data collected in the vehicle by executing the failure diagnosis process described later.

A method for implementing these elements constituting the information control GW 10, the basic GW 20, and the server 60 is not limited to software, and some or all of the elements may be implemented by using one or more hardware elements. For example, when the above functions are implemented by an electronic circuit that is hardware, the electronic circuit may be implemented by a digital circuit that includes a large number of logic circuits, an analog circuit, or a combination of the digital circuit and the analog circuit.

1-2. Process

[1-2-1. Vehicle Process]

The vehicle process executed by the CPU 11 of the information control GW 10 will be described with reference to a flowchart of FIG. 2.

In S110, the information control GW 10 periodically records information in a periodic diagnostic service. The periodic diagnostic service indicates the entire service for the server 60 to periodically diagnose the vehicle. The information control GW 10 executes a process for collecting the data necessary for the server 60 to periodically diagnose the vehicle, as a part of the periodic diagnostic service.

For example, the periodic diagnostic service is associated with a record condition for collecting information such as a battery voltage, a coolant temperature, a brake hydraulic pressure. The storages 14, 24, 34, 44, and 54 store, as periodic information, data satisfying this record condition.

When the data is collected, the storages 14, 24, 34, 44, and 54 store the data in accordance with the record condition. However, the record condition is set for each service. Each type of parameters is set as the record condition. Each type of the parameters includes the type of collected data, the record cycle at the time of recording the data, the resolution of each data, the collection time determined by a start time and an end time of the data collection, and a presence/absence of a signal as the trigger at a time of starting the data condition or the like. Details of the process storing the data in the storages 14, 24, 34, 44, and 54 will be described in the record process described later.

In S120, the information control GW 10 uploads the periodic information to the server 60. When a time for a preset cycle such as, for example, once a day lapses, or when a power supply of the vehicle first turns on or the like after the time for this cycle lapses, the periodic information is transmitted to the server 60 via the wireless section 15.

In S130, the information control GW 10 determines whether to have received a Plug and Play of a detailed diagnosis service. Here, the Plug and Play (PnP) represents a function of coordinating among hardware such as the information control GW 10 or the basic GW 20, firmware, driver, operating system, and application, and of autonomously building-in a connection instrument and setting the connection instrument when the connection instrument such as a peripheral instrument or an expansion card is connected to the information control GW 10.

However, in the Plug and Play described here, the connection instrument is unnecessary to be physically connected to the information control GW 10. It is also referred to as the Plug and Play that the connection instrument is not physically connected, a program regarding a certain service is received from the server 60, and the hardware and the software are coordinated. The Plug and Play may be implemented by connecting any peripheral instrument, any expansion card, or the like to the information control GW 10.

In the embodiment, by the Plug and Play, the collection condition is configured to be changed dynamically, that is, without restarting the system.

Figure 3:
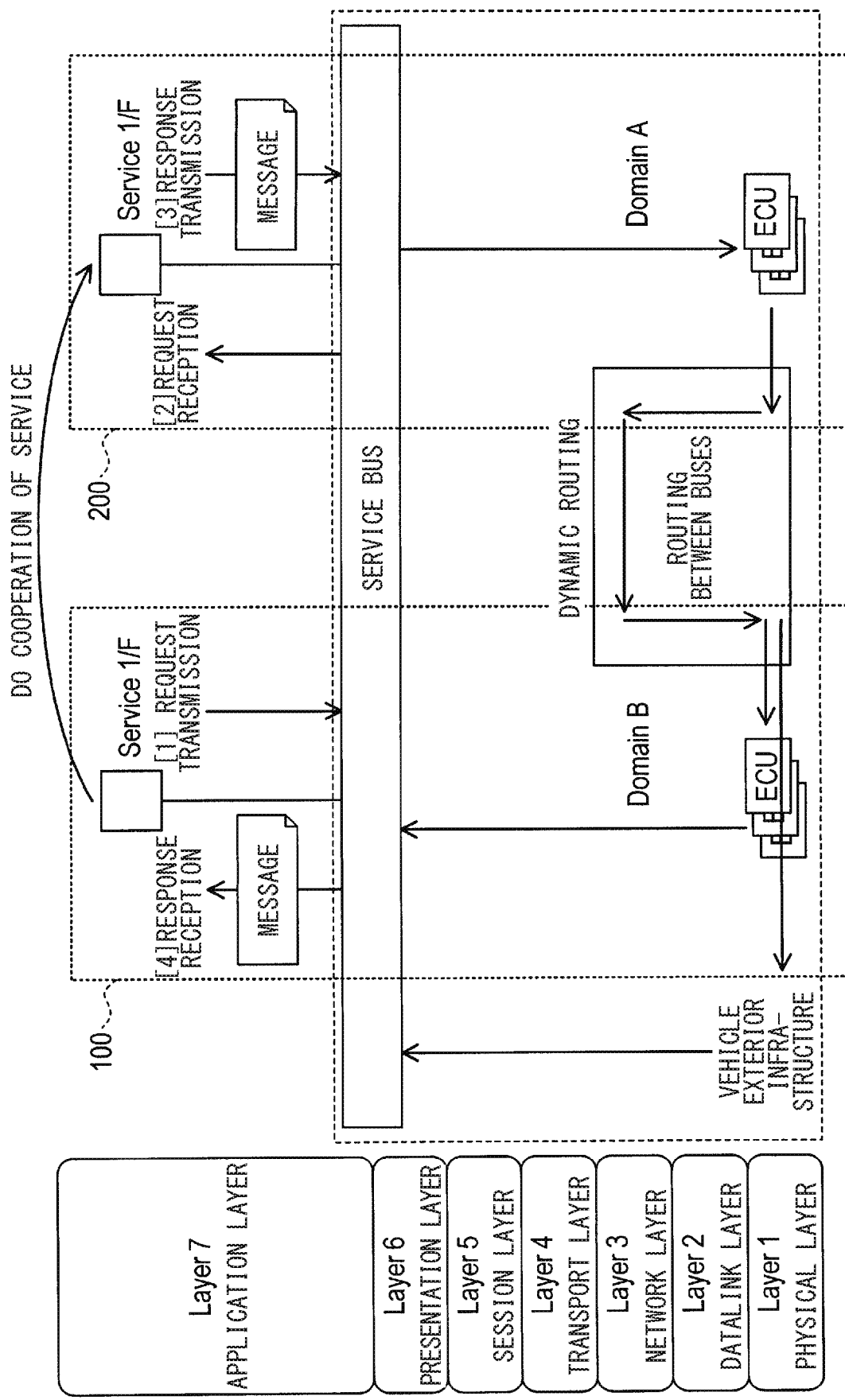
FIG. 3 is an explanatory view showing an overview of a service bus.

Here, the embodiment has a function as a service bus as one example of a configuration for implementing the Plug and Play, as shown in FIG. 3.

In the well-known multitier architecture, that is, in a configuration in which applications is divided into multiple layers and the layers is developable and maintainable as separate modules, the service bus is configured as an application bridging the data between the application layer, and the presentation layer and a lower layer representing any layer lower than the presentation layer.

The service bus transfers the data so that the multiple apparatuses performing the communication via the communication lines 5 and 6, here, the information control GW 10, the basic GW 20, and the ECUs 30, 40, and 50 are capable of performing the communication of the data as if were one apparatus. Therefore, the service bus includes a database for associating data used in the lower layer or a further lower layer with data used in the application layer. The service bus performs the data conversion between the application layer and the lower layer by referring this database.

For example, when one apparatus 100 utilizes one message as data that another apparatus 200 includes, one apparatus 100 transmits a request at the application layer, as shown in a "[1] REQUEST TRANSMISSION" of FIG. 3. The service bus converts to the data type suitable for the lower layer or the layer lower than the lower layer. Data transmission via the communication lines 5 and 6 is performed.

Another apparatus 200 receives this data, and the service bus converts to the data type utilizable in the application layer, and the request is recognized in the application layer as shown in "[2] REQUEST RECEPTION" of FIG. 3. As shown in "[3] RESPONSE TRANSMISSION" of FIG. 3, in reverse procedure to this, another apparatus 200 returns the message. As shown in "[4] RESPONSE RECEPTION" of FIG. 3, one apparatus 100 receives the message via the service bus.

That is, by placing the service bus, it is unnecessary to be concerned with a structure of the lower layer or the further lower layer when the application is developed.

The service bus has the following features.

[1] The service bus is middleware installed in an instrument such as the ECU mounted on the vehicle, a cloud server outside the vehicle, and a smartphone. Individual service buses are connected by inter-application communication, in-house communication, and external communication, and a single service bus is virtually built. The service bus hides the lower layer such as the in-vehicle communication. This configuration enables a service developer to focus on service development.

[2] The service bus receives a startup request from a vehicle system or service to activate. The service bus receives an end request from the vehicle system to end. That is, it may be possible to manage an activation state of the service bus from the outside.

[3] The presence of the service bus enables, for example, installation, uninstallation, and update of applications such as services. For example, it may be possible to start the service at an activation of the service bus or at a reception of a request of a start management service. It may be possible to stop the service at stop of the service bus or a reception of a request of a stop management service. That is, the presence of the service bus enables management of the service state.

[4] Due to the presence of the service bus, it may be possible to receive an execution request of a consumer service representing a service utilizing the certain service, and execute a provider service representing a service providing a certain service. For example, it may be possible to solve an installation position of the provider service, perform different access for each provider service in accordance with a consumer service, perform a priority control such as arbitration on a service unit or a message unit, or the like.

In the embodiment, at a time of the Plug and Play, the Plug and Play is implemented by a simple process by rewriting only the application corresponding to the application layer or the application corresponding to the application layer and the service bus.

Upon determining that the Plug and Play of the detailed diagnosis service has been received in S130, the information control GW 10 proceeds to S135, and changes the record condition to a record condition corresponding to the detailed diagnosis service. The detailed diagnosis service corresponds to a service that performs the failure diagnosis in more detail than the periodic diagnostic service. The record condition corresponding to the detailed diagnosis service is set to, for example, a condition that the type of stored data is more and frequency of acquiring the data is higher than the record condition corresponding to the periodic diagnostic service.

That is, in the process described above, input by the Plug and Play is received, and the type of data provided to the server 60 is changed. When the type of data is changed, it is set to receive a new record condition associated with the detailed diagnosis service from the outside and to utilize the new record condition in place of the record condition in the periodic diagnostic service.

In S140, the information control GW 10 records the detailed information in the detailed diagnosis service. The data satisfying the record condition corresponding to the detailed diagnosis service is stored as the detailed information in the storages 14, 24, 34, 44, and 54.

In S150, the information control GW 10 uploads the detailed information. The detailed information is immediately transmitted to the server 60 via the wireless section 15.

On the other hand, when the information control GW 10 determines that the Plug and Play of the detailed diagnosis service has been not received in S130, the information control GW 10 proceeds to S180 and determines whether the Plug and Play of a progress observation service has been received. The progress observation service is a service that observes a progress after a time at which it is diagnosed that the vehicle has failure.

Upon determining that the Plug and Play of the progress observation service has been received in S180, the information control GW 10 proceeds to S185, and changes the record condition to a record condition corresponding to the progress observation service. For example, the record condition corresponding to the progress observation service is set to a condition that the type of stored data is more than the record condition corresponding to the periodic diagnostic service and a state of a failure point is capable of being monitored, in accordance with the failure point.

In S190, the information control GW 10 records progress information in the progress observation service. Data satisfying the record condition corresponding to the progress observation service is stored as the progress information in the storages 14, 24, 34, 44, and 54.

In S200, the information control GW 10 uploads the progress information. When a time for a preset cycle such as, for example, once a day lapses similarly to the periodic information, the progress information is transmitted to the server 60 via the wireless section 15.

On the other hand, when the information control GW 10 determines that the Plug and Play of the progress observation service has been not received in S180, the information control GW 10 proceeds to S230 and determines whether entry guidance has been received. The entry guidance represents guidance for recommending entry into a repair shop since it is diagnosed that the failure occurs.

Upon determining that the entry guidance has been received in S230, the information control GW 10 proceeds to S240 and performs entry display in the display section 16. For example, the information control GW 10 causes the display section 16 to display, for example, a message of "Please undergo an inspection in a repair shop" or the like as the entry display.

On the other hand, when the information control GW 10 determines that the entry guidance has been not received in S230, the information control GW 10 proceeds to S250 and determines whether software rewrite has been received. The software rewrite is an instruction for rewriting the software of the information control GW 10, the basic GW 20, the ECUs 30, 40, and 50, or the like. Rewrite data corresponding to a program for update is also obtained with the instruction.

Upon determining that the software rewrite has been received in S250, the information control GW 10 proceeds to S260. After setting the software rewrite, the information control GW 10 ends the vehicle process of FIG. 2. It is set that the software is updated based on the rewrite data. The software is updated when the vehicle is not traveling such as at a time of parking.

Figure 2:
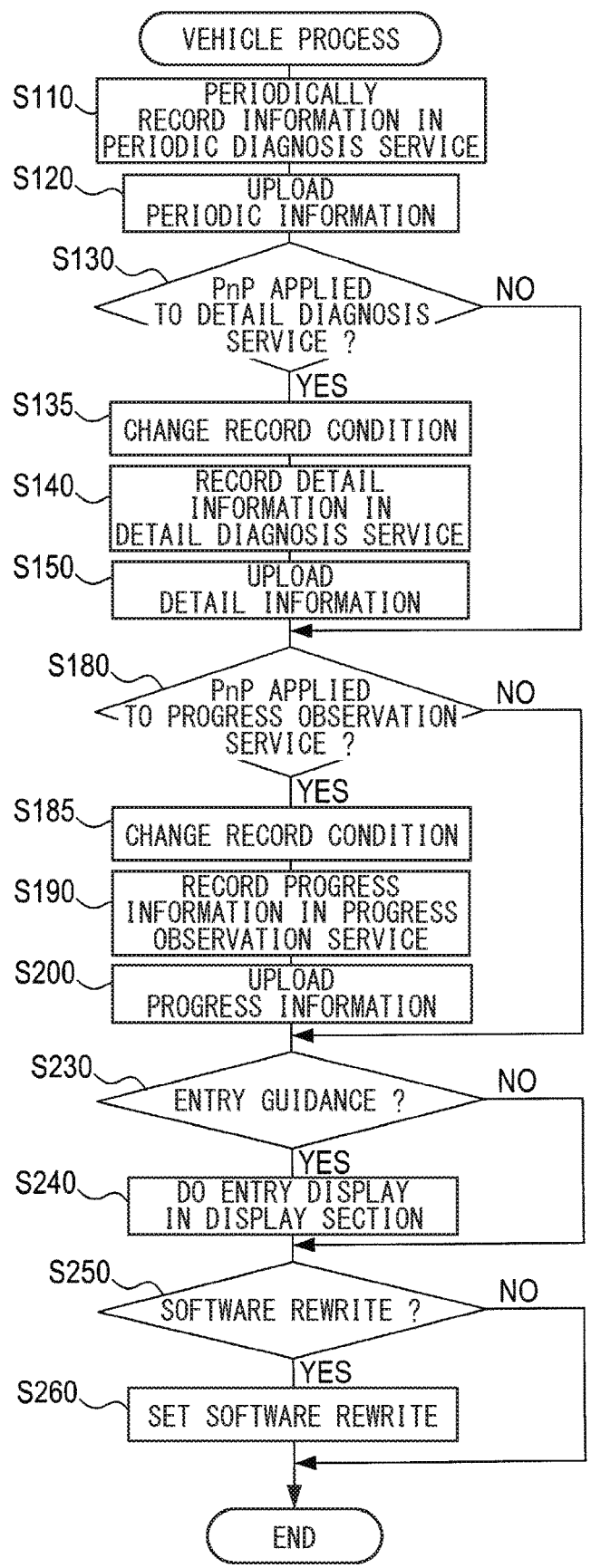
FIG. 2 is a flowchart showing a vehicle process.

On the other hand, upon determining that the software rewrite has been not received in S250, the information control GW 10 ends the vehicle process of FIG. 2.

[1-2-2. Failure Diagnosis Process]

The failure diagnosis process executed by the server 60 will be described with reference to the flowchart of FIG. 4. In the failure diagnosis process, in S310, the server 60 determines whether the periodic information has been acquired.

Upon determining that the periodic information has been acquired in S310, the server 60 proceeds to S320 and performs periodic diagnosis. The periodic diagnosis represents a process executed in the server 60 in the periodic diagnostic service. In the periodic diagnosis, for example, it is determined whether the periodic information deviates from standard information prepared in advance. When the periodic information deviates from the standard information, it is determined that there is abnormality.

In S330, the server 60 determines whether there is the abnormality in any part of the vehicle. Upon determining that there is the abnormality in S330, the server 60 proceeds to S340 and performs the Plug and Play of the detailed diagnosis service.

On the other hand, upon determining that there is not the abnormality in S330 or that the periodic information has not been acquired in S310, the server 60 proceeds to S370 and determines whether the detailed information has been acquired.

Upon determining that the detailed information has been required in S370, the server 60 proceeds to S380 and performs detailed diagnosis. The detailed diagnosis represents a process executed in the server 60 in the detailed diagnosis service. In the detailed diagnosis, it is determined that the periodic information deviates in more data from the standard information prepared in advance. However, the collection time of the data is set to be shorter than the periodic diagnostic service since a capacity of the storage is limited.

The server 60 recognizes whether the which data of the detailed information deviates from the standard information, and estimates the abnormal point in accordance with the type of data in which the abnormality is recognized. Then, it is identified, at least, whether the abnormality is a hardware failure or a software abnormality.

In S390, the server 60 determines whether the vehicle has had the failure. Upon determining that the vehicle has had the failure in S390, the server 60 proceeds to S400 and determines whether the failure is the hardware failure.

Upon determining that the failure is the hardware failure in S400, the server 60 proceeds to S410. After transmitting the entry guidance, the server 60 proceeds to S430. On the other hand, upon determining that the failure is not the hardware failure in S400, the server 60 proceeds to S420 and transmits the software rewrite.

Upon determining that the vehicle has not had the failure in S390, the server 60 proceeds to S430 and performs the Plug and Play of the progress observation service.

Upon determining that the detailed information has not been acquired in S370, the server 60 proceeds to S460 and determines whether the progress information has been acquired. Upon determining that the progress information has been acquired in S460, the server 60 proceeds to S470 and performs the progress observation. In the progress observation, it is recognized that which data of the progress information deviates from the standard information. The abnormal point is estimated in accordance with the type of data in which the abnormality is recognized.

In S480, the server 60 determines whether there is a difficulty in the progress observation. Upon determining that there is the difficulty in the progress observation in S480, the server 60 proceeds to S490. After transmitting the entry guidance, the server 60 ends the failure diagnosis process of FIG. 4.

Figure 4:
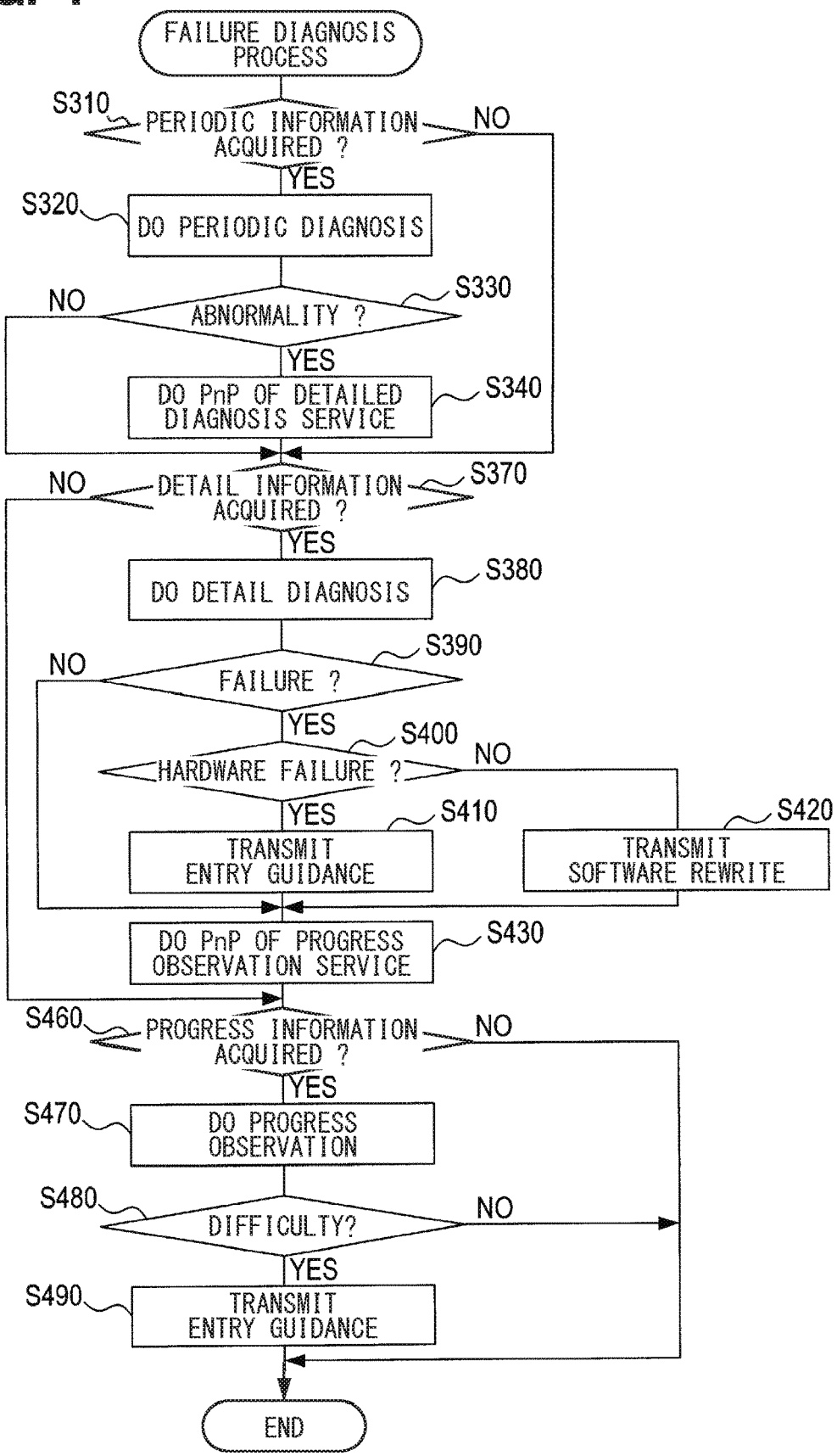
FIG. 4 is a flowchart showing failure diagnosis process.

On the other hand, upon determining that the progress information has not been acquired in S460 and upon determining that there is not difficulty in the progress observation in S480, the server 60 ends the failure diagnosis process of FIG. 4. The free capacity may be referred to as the free area.

[1-2-3. Record Process and Data Transmission Process]

A record process executed by the information control GW 10 will be described with reference to the flowchart of FIG. 5. The record process described below represents details of S110, S140, and S190. In S610, the information control GW 10 recognizes the free capacity of each storage.

Figure 6:
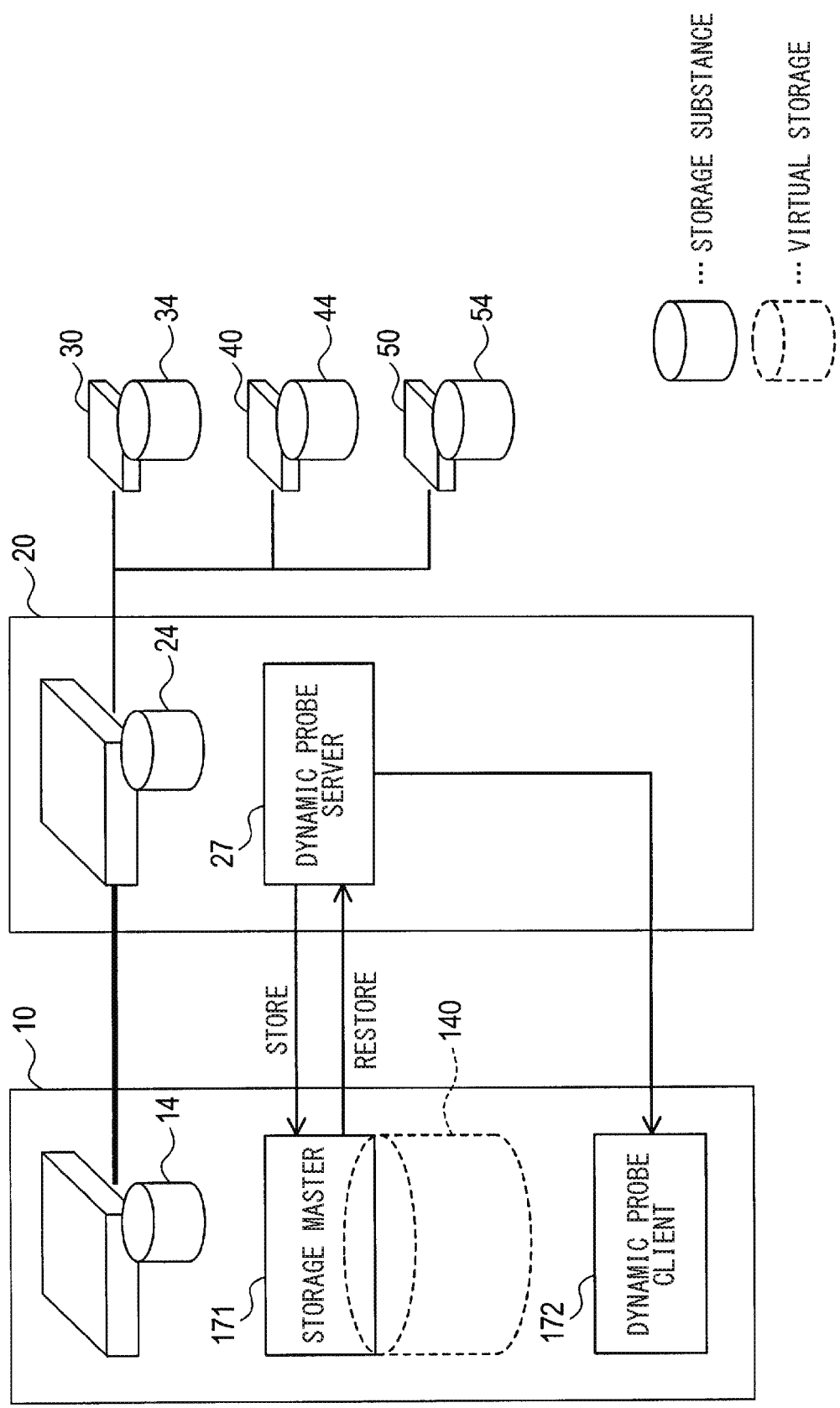
FIG. 6 is a block diagram showing a function of managing storage.

In this process, as shown in FIG. 6, the information control GW 10 and the basic GW 20 cooperate and recognize the free area of the storages 14, 24, 34, 44, and 54 of each of the apparatuses connected to each of the communication lines 5 and 6.

Figure 7:
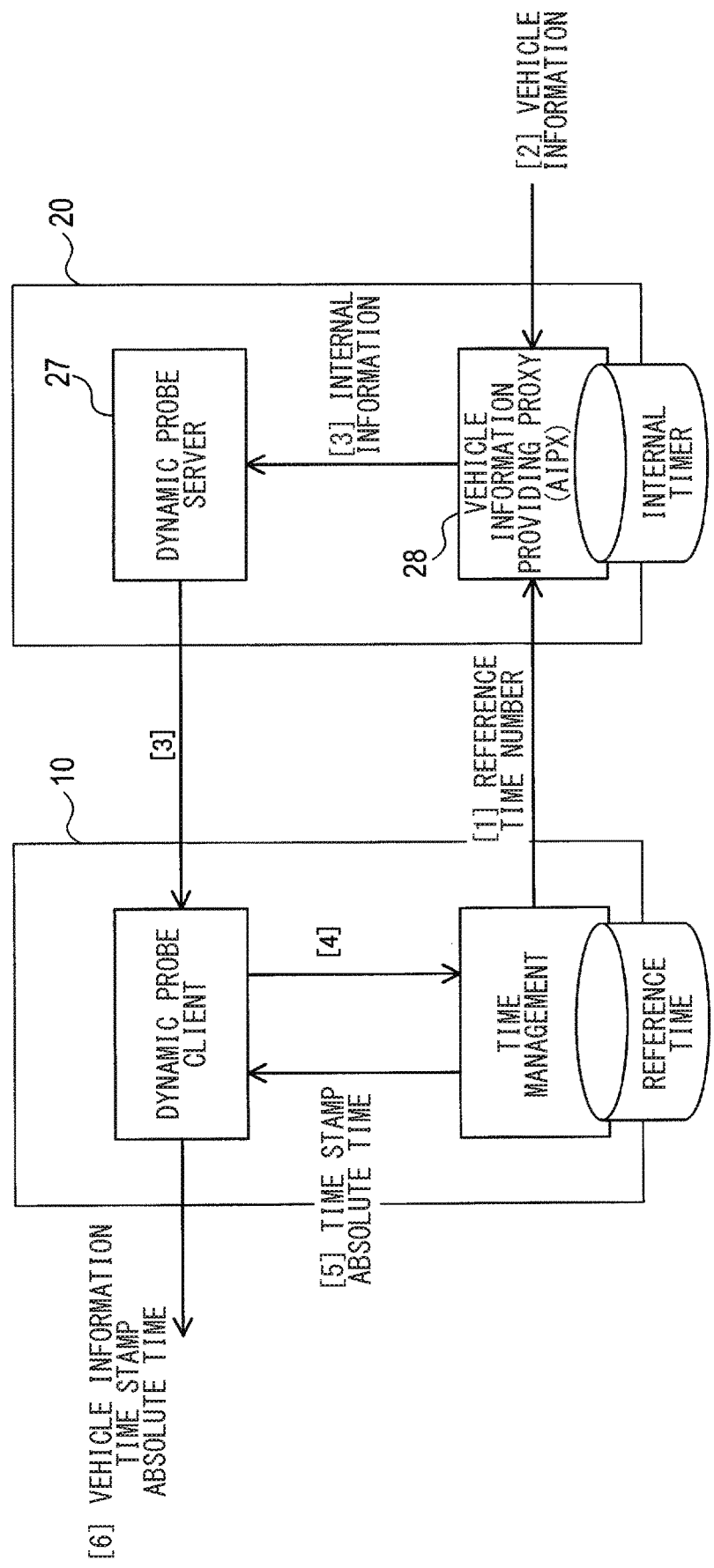
FIG. 7 is a block diagram showing a function of managing time information.

The information control GW 10 has, as a part of functions of the record control section 17, a function as a storage master 171 and a function as a dynamic probe client 172, as shown in FIG. 6 and FIG. 7. The basic GW 20 has a function as a dynamic probe server 27, as shown in FIG. 6 and FIG. 7.

The storage master 171 has a function of recognizing the free areas of the storages 14, 24, 34, 44, and 54 and setting a position for recording the data.

The dynamic probe client 172 has a function of transmitting reference time information and applying the absolute time to the received data.

The dynamic probe server 27 has a function of adding internal information for applying time information to the transmitted data in the information control GW 10.

In each of the storages 14, 24, 34, 44, and 54, an area in which the data by the record process is recordable is preset. The information control GW 10 recognizes the free area of the storage 14 of the own apparatus in this area by utilizing the function as the storage master 171. The basic GW 20 recognizes the free areas of multiple storages 14, 24, 34, 44, and 54 connected to a subordination of the basic GW 20, that is, the communication line 6 in a side of the basic GW 20 by utilizing the function as the dynamic probe server 27.

Then, the basic GW 20 recognizes the free area by the communication between the basic GW 20 and the ECUs 30, 40, and 50, and transmits this information to the information control GW 10.

In S620, the information control GW 10 sets the record address. The record address represents a position of the free area in each of the storages 14, 24, 34, 44, and 54, that is, an address.

In S630, the information control GW 10 transmits the reference time information. The reference time information represents an uniquely identifiable number of a reference time. The reference time represents a time corresponding to a reference managed by the information control GW 10 and the absolute time.

In the information control GW 10, a table in which the reference time number and the absolute time are linked is prepared in advance. This process corresponds to a process that the information control GW 10 transmits the "[1] Reference time number" to the basic GW 20 in FIG. 7.

Figure 8:
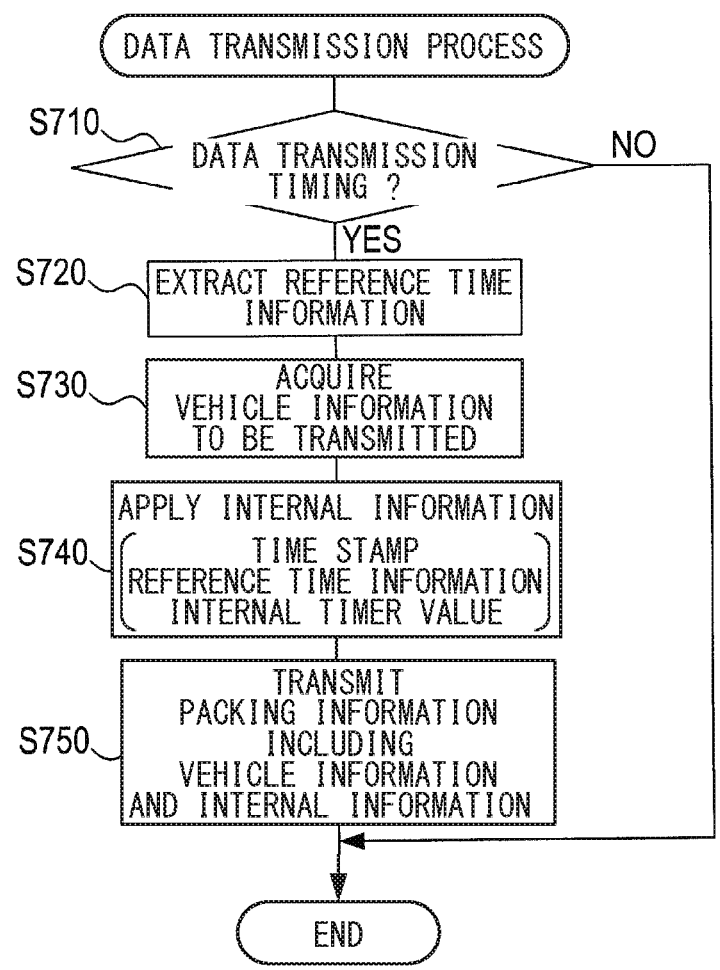
FIG. 8 is a flowchart showing a data transmission process.

After these processes, the basic GW 20 executes a data transmission process shown in FIG. 8. The data transmission process executed by the basic GW 20 will be described with reference to a flowchart of FIG. 8.

In S710, the basic GW 20 determines whether it is a data transmission timing. The data transmission timing represents a preset timing as a timing at which the basic GW 20 should transmit the data.

Upon determining that it is not the data transmission timing in S710, the basic GW 20 ends the data transmission process of FIG. 8. On the other hand, upon determining that it is the data transmission timing in S710, the basic GW 20 proceeds to S720 and extracts the reference time information from the received data.

In S730, the basic GW 20 acquires the vehicle information to be transmitted. This process corresponds to a process that the basic GW 20 acquires "[2] vehicle information" by utilizing the function as a vehicle information providing proxy 28 in FIG. 7. The vehicle information corresponds to general data handled in the vehicle such as information obtained by a sensor or the like, or information obtained by calculation by the ECU.

In S740, the basic GW 20 applies the internal information. The internal information includes a time stamp. The time stamp includes the reference time number and an internal timer value.

The reference time number represents a number linked to the reference time of the information control GW 10. The internal timer value represents counter time values of the basic GW 20 and the other ECUs 30, 40, and 50.

This process corresponds to a process that the basic GW 20 transmits "[3] Internal information" to the dynamic probe server 27 by utilizing the function as the vehicle information providing proxy 28 in FIG. 7.

In S750, after transmitting packing data, the basic GW 20 ends the data transmission process of FIG. 8. The packing data represents data including vehicle information and internal information.

Figure 5:
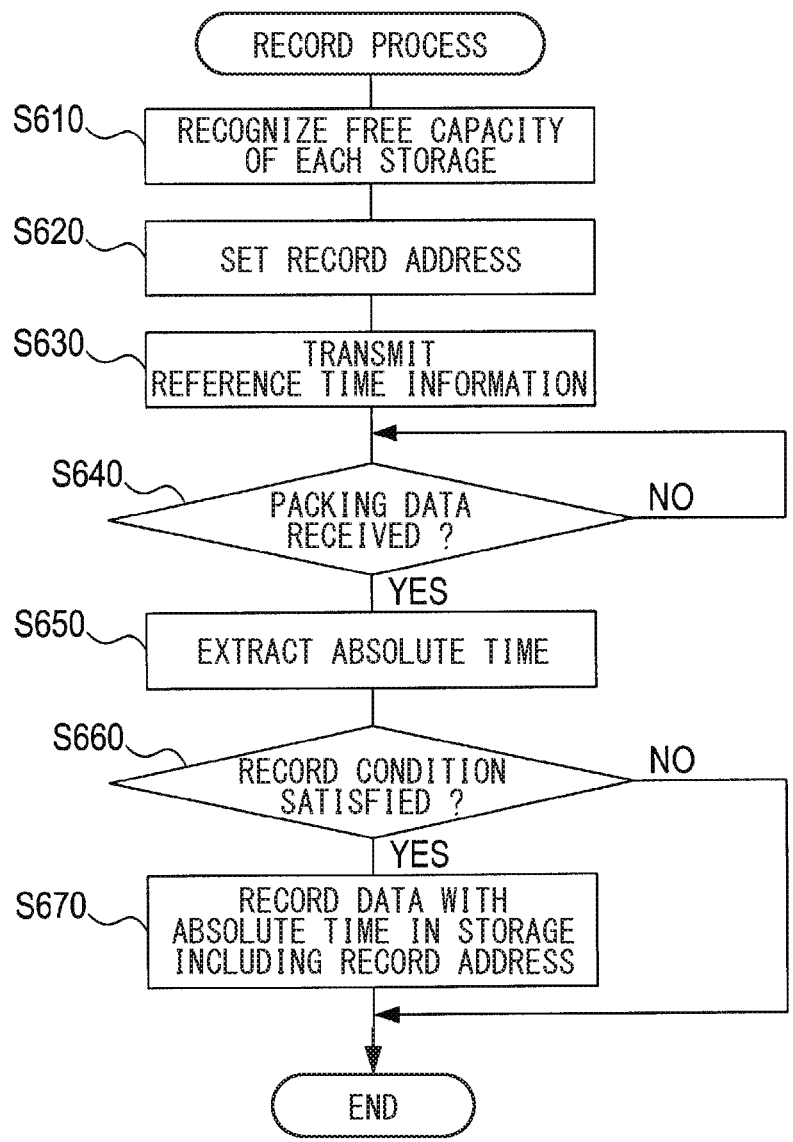
FIG. 5 is a flowchart showing a record process.

The information control GW 10 receives such a data transmission process, and executes a process in S640 and subsequent processes shown in FIG. 5. In S640, the information control GW 10 determines whether the packing data has been received.

Upon determining that the packing data has not been received in S640, the information control GW 10 returns to S640. On the other hand, upon determining that the packing data has been received in S640, the information control GW 10 proceeds to S650 and extracts the absolute time. In this process, a delay time due to the communication and a delay time due to the internal process of the basic GW 20 are calculated by utilizing the reference time information transmitted by the information control GW 10, the absolute time when the packing data is received, and the internal timer value. The time when the vehicle information is obtained is estimated.

A middle value between the reference time information transmitted by the information control GW 10 and the absolute time when the packing data is received may be estimated as the time when the vehicle information is obtained. A value obtained by subtracting the preset time in accordance with a performance of the basic GW 20 from the middle value, that is, a time earlier than the middle time may be estimated as the time when the vehicle information is obtained.

In S660, the information control GW 10 determines whether the record condition is satisfied. Upon determining that the record condition is satisfied in S660, the information control GW 10 proceeds to S670. After applying the absolute time by using the function of the dynamic probe client 172, the information control GW 10 records the data in the storage corresponding to the recorded address, and ends the record process of FIG. 5. The record condition here is a record condition set in accordance with the type of service.

On the other hand, upon determining that the record condition is not satisfied in S660, the information control GW 10 ends the record process of FIG. 5.

1-3. Effects

According to the embodiment described in detail above, the following effects are obtained.

(1a) The information control GW 10 of the present disclosure controls the record of the data to the storages 14, 24, 34, 44, and 54. The CPU 11 functions as the record control section 17. The CPU 11 acquires the multiple types of data, and storages in the storages 14, 24, 34, 44, and 54, the data matching the record condition prepared in advance among the acquired data.

The CPU 11 functions as the condition change section 19. The CPU 11 is configured to set to utilize the new record condition in place of the old record condition upon receiving the new record condition different from the old record condition from the outside.

In such an information control GW 10, it may be possible to store the data in the storages 14, 24, 34, 44, and 54 in accordance with the new record condition upon receiving the new record condition. Therefore, it may be possible to efficiently store the required data in accordance with the capacities of the storages 14, 24, 34, 44, and 54 by setting the appropriate record condition.

(1b) In the information control GW 10 described above, the CPU 11 functions as the record control section 17. The CPU 11 confirms the free area representing the area in which the data is recordable in the multiple storages 14, 24, 34, 44, and 54 placed in different positions from each other. The CPU 11 sets the address indicating the position of the free area. The CPU 11 records the data in the free area in accordance with the address.

In such an information control GW 10, it may be possible to search the positions of the free areas of the multiple storages 14, 24, 34, 44, and 54 to record the data in these free areas. Therefore, it may be possible to utilize the multiple storages 14, 24, 34, 44, and 54 as if single storages 14, 24, 34, 44, and 54.

(1c) In the information control GW 10, the CPU 11 functions as the time management section 18, and transmits the reference time information to the basic GW 20. The basic GW 20 is an apparatus as a communication counterpart of the information control GW 10. Upon receiving the reference time information representing the time managed by the information control GW 10, the basic GW 20 returns to response data obtained by applying the information to be transmitted by the basic GW 20 to the reference time information (for example, the packing data).

The CPU 11 functions as the time management section 18. The CPU 11 acquires the response data, and sets a generation time based on the reference time information of the response data. The CPU 11 functions as the record control section 17, and associates the generation time of the response data with the data to record the data.

In such an information control GW 10, the basic GW 20 returns the reference time information transmitted by the information control GW 10 with the information to be transmitted. Therefore, it may be possible to associate the obtained data with the time of the information control GW 10 to record the time, even when the basic GW 20 does not have the time information or when the time information of the basic GW 20 is different from the time of the information control GW 10.

(1d) In the information control GW 10 describe above, the CPU 11 functions as the record control section 17. The CPU 17 provides the data stored in the storages 14, 24, 34, 44, and 54 to the server 60 positioned outside the information control GW 10.

The CPU 11 functions as the condition change section 19. When the Plug and Play is input, the CPU 11 changes, at least, the type of data provided by the information control GW 10.

In such an information control GW 10, it may be possible to change the type of data provided by the information control GW 10 by only the simple operation of the user since the type of data provided in the Plug and Play is changed.

(1e) In the information control GW 10 described above, the CPU 11 functions as the condition change section 19. The CPU 11 sets to utilize the new record condition when the type of data provided by the information control GW 10 is changed.

In such an information control GW 10, it may be possible to change the record condition in the Plug and Play.

2. Other Embodiments

Although the embodiments of the present disclosure have been described above, the present disclosure is not limited to the embodiments described above, and various modifications can be made to implement the present disclosure.

(2a) In the embodiment described above, the own vehicle information representing the vehicle on which the information control GW 10 is mounted is collected, and is provided to the server 60. However, it may be set that, with utilizing the request from the own vehicle as the trigger, the other vehicle information representing the vehicle other than the own vehicle is collectable via the server 60. In this case, when the trigger is received via the server 60, the information control GW 10 may provide the preset data. In this case, it may be set that information related to privacy is defined and the corresponding other vehicle information is not acquirable from the own vehicle.

Information from other vehicles is utilizable for the following objects.

[1] The information is utilized for collecting the vehicle information of the same kind of vehicle with the own vehicle for the failure diagnosis of the own vehicle.

[2] The information is utilized for collecting wiper operation information around a destination for confirming whether it is raining around the destination.

[3] The information is utilized for setting so that the vehicle information such as images, movies, or audios is collectable for predicting a position of an obstacle on a road or the like.

[4] The information is utilized for changing a vehicle information collection condition from a user terminal such as a smartphone from a remote location to collect camera images or movie information of the own vehicle.

[5] The information is utilized for changing the vehicle information collection condition to collect in-vehicle audio information for analyzing a factor at the time of failure or accident.

[6] The information is utilized for providing a bus load check function to the server 60, the information control GW 10, or the ECUs 30, 40, and 50 to set to surely establish communication related to control by controlling so that the load does not become too large.

[7] The information is utilized for absorbing differences of manufacturers, vehicle types, and sensors to provide information, by generalizing the vehicle information to provide the vehicle information. The information is utilized for enabling more in-vehicle devices or the like to share the data.

[8] The information is utilized for utilizing a camera, a millimeter wave radar, a laser radar, or the like when the obstacle is detected.

(2b) The information control GW 10 and the basic GW 20 may have the following functions.

[1] Probe Master

A Probe master is a function of collecting any vehicle information in any term by any trigger to provide the information based on a changeable collection condition in accordance with use cases. For example, all of the vehicle information is virtually collected and all of the vehicle information is provided.

Specific needs: The vehicle information is collected based on the changeable collection condition to be provided based on a trigger from the collection condition service or a trigger of the vehicle detecting failure or a sign of the failure, for performing the periodic diagnosis, the detailed diagnosis, and the progress observation cooperated with a cloud.

[2] Vehicle Information Providing Proxy
(Automotive Information Proxy, AIPX)

A vehicle information providing proxy is a function of generalizing the vehicle information such as the control or diagnostic frames to provide the vehicle information in a form required by the services. It may be possible to, for example, allow or reject different access control for each vehicle information in accordance with the service user. A control logic is hided from the outside by processing the vehicle information in accordance with the service user. Specific needs: The AIPX is utilized for converting speed information to a form easily utilized by the service user such as "1500 pulses/sec", "100 km/h", or "limit speed exceeding" and providing the speed information.

[3] Storage Master

A storage having a capacity required by the service is provided by centrally managing a surplus storage of control ECUs distributed in the vehicle. Specific needs: A storage service is utilized when a storage recording the collected vehicle information lacks due to the change of the collection condition. In a case of replacing the hardware, the storage service is utilized when the data is saved. The storage service is utilized when the storage recording individual settings for each user lacks.

That is, the storage master 171 determines whether the data may be recorded in a specific record section corresponding to one of the multiple storages. The specific record section represents, for example, the storage 14 of the information control GW 10 corresponding to the apparatus on which the storage master 171 is mounted.

A case where the data is not recordable in the specific record section corresponds to a case where the area of the storage 14 lacks due to the change of the collection condition, a case where the storage 14 is not utilizable at a time of hardware replacement or the like, a case where the storage 14 recording individual settings for each user lacks, or the like. The configuration of detecting that the collection condition is changed, the storage 14 is not utilizable, and the storage 14 lacks may include a configuration of performing separate determination, and a configuration that a signal indicating the determination is input.

When the data is not recordable in the specific record section, the storage master 171 confirms the free capacity of the other storage 24 or the like, and records the data in accordance with the address of the free capacity. The storage master 171 causes the storage 14 to record the data when the data is storable in the storage 14.

[4] Time Management Service

A time management service provides the time or an elapsed time from a certain time. The time management service includes the ECU that may not acquire the absolute time. Specific needs: For the failure diagnosis, in a case where an event is recorded, the time management service is utilized for recording in the basic GW that may not acquire the absolute time, a time when the vehicle information is collected or a time when information occurs in the ECU.

[5] Vehicle Exterior Communication Service

The vehicle exterior communication service absorbs the difference between a vehicle exterior protocol and a service bus message to transmit/receive the message with a vehicle exterior service. Specific needs: For the failure diagnosis, the vehicle exterior communication service is utilized when the collected vehicle information is uploaded to the cloud.

[6] Vehicle State Notification Service

A vehicle state notification service provides the vehicle state utilized for the collection condition determination. The vehicle state includes a power state. Specific needs: The vehicle state notification service is utilized when in a case where vehicle information when the ignition turns on or vehicle information when +B is activated is required to be collected. The vehicle state notification service is utilized when the vehicle information is required to be collected at lane change.

[7] Diagnosis Master

The diagnosis master provides a diagnosis frame required by the service. For performing the failure diagnosis cooperating with the cloud, the diagnosis master is utilized for reading out a DTC or an operation factor.

[8] Reprogram Master

A reprogram master changes the vehicle information that is collectable or providable by the software rewrite of the condition service, the AIPX (access control or processing), or the ECU. Specific needs: The reprogram master is utilized when the change of the collection condition or the rewrite of the software other than the PnP application is required.

(2c) A plurality of functions of one element in the above embodiment may be implemented by a plurality of elements, or one function of one element may be implemented by a plurality of elements. Further, a plurality of functions of a plurality of elements may be implemented by one element, or one function implemented by a plurality of elements may be implemented by one element. In addition, a part of the configuration of the above embodiment may be omitted. At least a part of the configuration of the above embodiment may be added to or replaced with another configuration of the above embodiment. All modes included in the technical idea identified by the wording described in the claims correspond to embodiments of the present disclosure.

(2d) The function of the information control GW 10 and the function of the basic GW 20 may be provided to each other, or one may have all of the other function. Specifically, the functions of the record control section 17, the time management section 18, and the condition change section 19 of the information control GW 10 may be implemented by the basic GW 20. The functions of the vehicle information collection section 26A, the vehicle information conversion section 26B, and the in-vehicle software rewrite section 26C of the basic GW 20 may be implemented by the information control GW 10.

(2e) In addition to the data providing system 1 described above, the present disclosure is implementable in various modes, such as a device configuring a component of the data providing system 1, a program for causing a computer to function as the data providing system 1, a non-transitory tangible recording medium such as a semiconductor memory in which the program is recorded, and a data management method.

3. Correspondence Relation Between the Configuration of the Embodiment and the Configuration of the Present Disclosure In the embodiment described above, the information control GW 10 may correspond to a record control apparatus in the present disclosure. In the embodiment described above, the basic GW 20 may correspond to a partner apparatus in the present disclosure. In the embodiment described above, the server 60 may correspond to a providing destination apparatus in the present disclosure. In the embodiment described above, the storages 14, 24, 34, 44, and 54 may correspond to a record section in the present disclosure.

In the embodiment described above, a function as the record control section 17 of the information control GW 10 may correspond to a data acquisition section in the present disclosure. In the embodiment described above, the vehicle information conversion section 26B of the basic GW 20 or the information control GW 10 may correspond to a data output section in the present disclosure. In the embodiment described above, the processes in S110, S140, S190, and S670 among the processes executed by the information control GW 10 may correspond to a data storage section in the present disclosure. In the embodiment described above, the processes in S120, S150, and S200 may correspond to a data providing section in the present disclosure. In the embodiment described above, the processes in S135, S185, and S260 may correspond to a condition change section and a type change section in the present disclosure In the embodiment described above, the process in S610 may correspond to an area confirmation section in the present disclosure. In the embodiment described above, the process in S620 may correspond to an address setting section in the present disclosure. In the embodiment described above, the process in S630 may correspond to a time transmission section in the present disclosure. In the embodiment described above, the process in S640 may correspond to a time setting section in the present disclosure.

The invention claimed is:

1. A record control apparatus configured to control a record of a data item in one or more record sections, the record control apparatus comprising:
   a data acquisition section configured to acquire the data item having a plurality of types;
   a data storage section configured to store in the one or more record sections, the one or more data items matching a record condition prepared in advance among the acquired data item having the plurality of types;
   a condition change section configured to
      define the record condition as an old record condition, and
      set so that the data storage section utilizes a new record condition in place of the old record condition when receiving the new record condition different from the old condition from an outside;
   a time transmission section configured to transmit reference time information to a partner apparatus, wherein the partner apparatus corresponds to a communication counterpart of the record control apparatus, and returns response data item obtained by applying information to be transmitted by the partner apparatus to the reference time information when receiving the reference time information indicating a time managed by the record control apparatus; and
   a time setting section configured to
      acquire the response data item, and
      set a generation time of the response data item based on the reference time information of the response data item,
   wherein:
   the data storage section causes to record the data item in association with the generation time of the response data item.

2. The record control apparatus according to claim 1, further comprising:
   a data providing section configured to provide the data item stored in the one or more record sections to a providing destination apparatus positioned outside the record control apparatus; and
   a type change section configured to, at least, change a type of the data item provided by the data providing section when a Plug and Play is input.

3. A record control apparatus configured to control a record of a data item in one or more record sections, the record control apparatus comprising:
   a data acquisition section configured to acquire the data item having a plurality of types;
   a data storage section configured to store in the one or more record sections, the one or more data items matching a record condition prepared in advance among the acquired data item having the plurality of types;
   a condition change section configured to
      define the record condition as an old record condition, and
      set so that the data storage section utilizes a new record condition in place of the old record condition when receiving the new record condition different from the old condition from an outside;

a data providing section configured to provide the data item stored in the one or more record sections to a providing destination apparatus positioned outside the record control apparatus; and a type change section configured to, at least, change a type of the data item provided by the data providing section when a Plug and Play is input.

4. The record control apparatus according to claim 2, wherein:

the condition change section is configured to set so that the data storage section utilizes the new record condition when the type change section changes the type of the data item provided by the data providing section.

5. The record control apparatus according to claim 1, further comprising:

a data output section configured to
convert the data item stored in the one or more record sections to a preset form in accordance with a providing destination of the data item, and
output the converted data item to the providing destination of the data item.

6. A record control apparatus configured to control a record of a data item in one or more record sections, the record control apparatus comprising:

a data acquisition section configured to acquire the data item having a plurality of types;

a data storage section configured to store in the one or more record sections, the one or more data items matching a record condition prepared in advance among the acquired data item having the plurality of types;

a condition change section configured to
define the record condition as an old record condition, and
set so that the data storage section utilizes a new record condition in place of the old record condition when receiving the new record condition different from the old condition from an outside; and a data output section configured to
convert the data item stored in the one or more record sections to a preset form in accordance with a providing destination of the data item, and
output the converted data item to the providing destination of the data item.

7. The record control apparatus according to claim 1, further comprising:

the one or more record sections including a plurality of record sections placed at different positons from each other;

an area confirmation section configured to confirm a free area in the plurality of record sections, the free area indicating an area in which the data item is recordable; and an address setting section configured to set an address indicating a position of the free area, wherein:

the data storage section causes to record the data item in the free area in accordance with the address.

8. The record control apparatus according to claim 7, wherein:

the area confirmation section is configured to
determine whether the data item is recordable in a specific record section corresponding to one of the plurality of record sections, and
confirm the free area when the data item is not recordable in the specific record section; and the data storage section is configured to
cause the specific record section to record the data item when the data item is recordable in the specific record section, and
cause to record the data item in the free area in accordance with the address when the data item is not recordable in the specific record section.

9. The record control apparatus according to claim 1, wherein:

a processer functions as
the data acquisition section,
the data storage section,
the condition change section,
the time transmission section, and
the time setting section.

* * * * *